Aug. 14, 1928.

J. KARASIEVICZ

DOUBLE SUN SPECTACLE

Filed Aug. 19, 1926

1,680,995

INVENTOR
Joseph Karasievicz
BY
ATTORNEY

Patented Aug. 14, 1928.

1,680,995

UNITED STATES PATENT OFFICE.

JOSEPH KARASIEVICZ, OF SOUTH AMBOY, NEW JERSEY.

DOUBLE SUN SPECTACLE.

Application filed August 19, 1926. Serial No. 130,126.

This invention relates generally to a device for observing the sun, the invention having more particular reference to a novel type of device for this purpose. The invention has for an object the provision of an improved device which may be readily and easily operated. A further object is to provide a device of this nature which will permit of viewing the sun, at such times as when an eclipse may occur, or to observe sun spots or any peculiar phenomenon, by means of a colored transparent member, or by a combination of two or more such pieces of different color which will permit a double view of the sun, eclipse or the viewed phenomenon. This invention is a further improvement on my original invention for which Letters Patent No. 1,592,528 has been issued on July 13, 1926.

For further comprehension of the invention, and of the objects and advantages thereof, reference will be had to the following description and accompanying drawings and to the appended claim in which the various novel features of the invention are more particularly set forth.

Fig. 1 of the drawings is a top plan view of my improved device for observing the sun.

Figure 1:
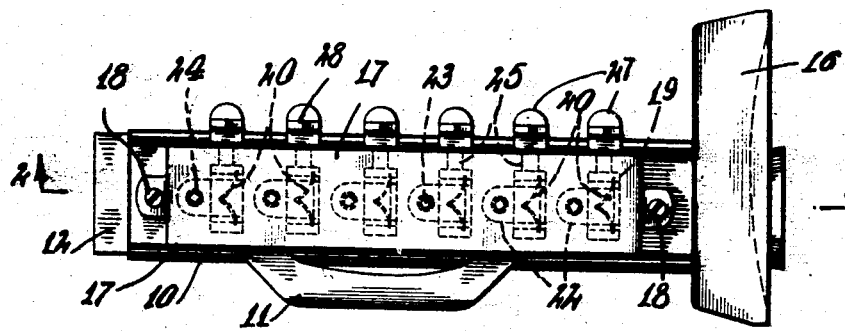
Figure 2:
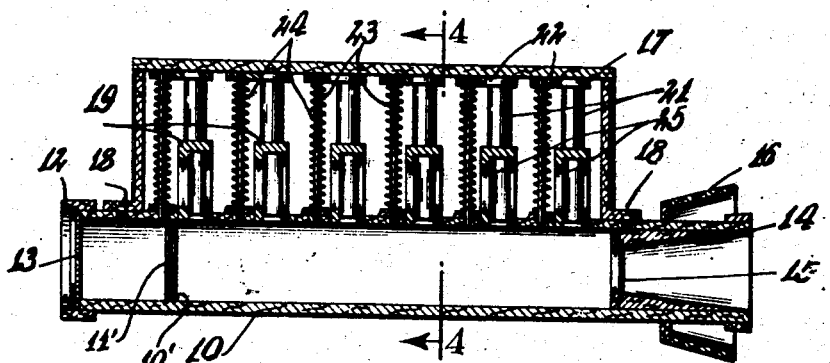
Fig. 2 is a longitudinal sectional view taken on the line 2—2 of Fig. 1.
Figure 3:
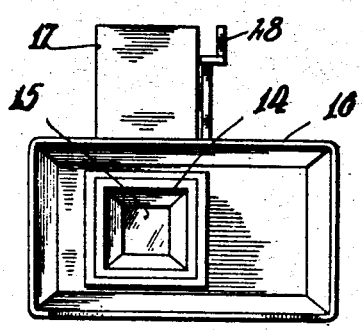
Fig. 3 is a front elevational view thereof.
Figure 4:
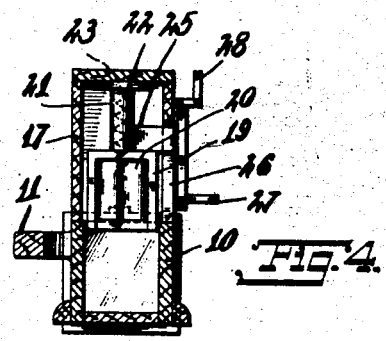
Fig. 4 is a transverse sectional view taken on the line 4—4 of Fig. 2.

As here embodied my improved device for observing the sun comprises a box 10, or enclosure with a suitable handle 11, and open at both ends to which are attached the eye piece 12, having a glass 13 or lens in its aperture or center opening, and the front piece 14 having a glass 15 or lens in its aperture or center opening. The box 10 is provided with a frame 10', adapted to support a translucent member 11', preferably colored glass, celluloid, or the like. The visor 16 is attached at or near the front end of the box 10, and extends therefrom. The secondary box 17, provided with an open side, is attached, as at 18, by screws, bolts, or the like to the top of the said box 10.

The frames 19 have apertures or center openings, similar to the hereto before mentioned aperture or center opening in the eye piece 12 and in the front piece 14, the various colored pieces 20, which may be of glass, celluloid, or any other similar material, and which are shaped or formed of two curved elements, verging from the center thereof, as clearly shown in Fig. 1. This acts to produce a double view of the sun seen in colors of the pieces 20. The frames 19 are slidably positioned in elongated apertures cut or formed in the top of the box 10, and have attached thereto, and extended upwardly therefrom perpendicular members 21, which have attached thereto, at the upper extremities of the perpendicular members 21, arms 22, extended horizontally therefrom. The rods 23 are attached at their upper extremities to the top of the secondary box 17, and extend downward therefrom, and are attached at their lower extremities to the top of the box 10. The springs 24 are wound or positioned on the rods 23, and are superimposed between the arms 22 and the top of the box 10, so as to normally hold the colored pieces 20 in the secondary box 17 or in an "unused" position.

The extended members 25 are attached at one extremity to the perpendicular members 21, and extend horizontally therefrom, through elongated apertures 26, or slots, formed in one side of the secondary box 17. The extended members 25 have attached at their extended extremities, handles 27 and 28, or similar suitable extended members. The above described construction is such as will permit the colored pieces 20 to be slid into an "in use," or visual position, by pressing or forcing either one or both of the handles 27 downwardly. It is understood that any desired number of colored pieces 20 may be slid into a visual position at the same time should a combination of colors be required.

Having herewith described my improved device in detail, the use and manipulation of the same is obvious.

While I have above described the preferred form, construction, and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:

In a device for observing the sun, the combination of a box open at opposite ends, a front eye piece mounted at one of the ends, a visor at the opposite end, a closed compartment attached to said box, frames slidably mounted in said compartment and box, the said frames being spaced longitudinally along the length of the box, colored transparent panes verging from the center, mounted in each of said frames, means mounted externally of the compartment for selectively moving the colored panes into an operative position within the box, and means mounted within the compartment for automatically returning the panes into an inoperative position within the compartment.

In testimony whereof I have affixed my signature.

JOSEPH KARASIEVICZ.